April 17, 1945.    A. F. ECKEL    2,374,003
COLLINEAR REFLECTOR
Filed Feb. 23, 1942    2 Sheets-Sheet 1
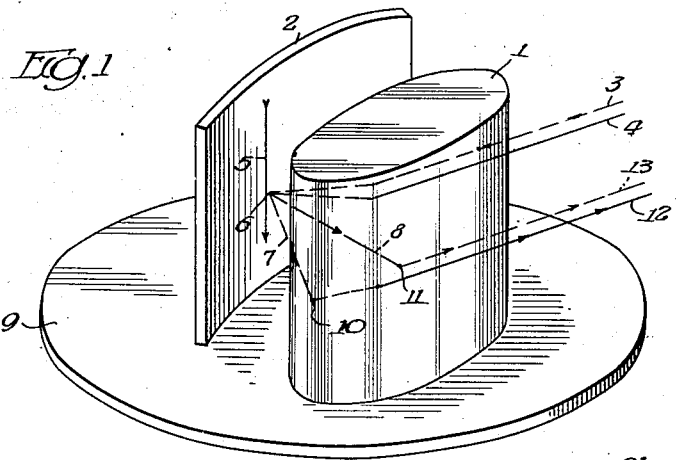
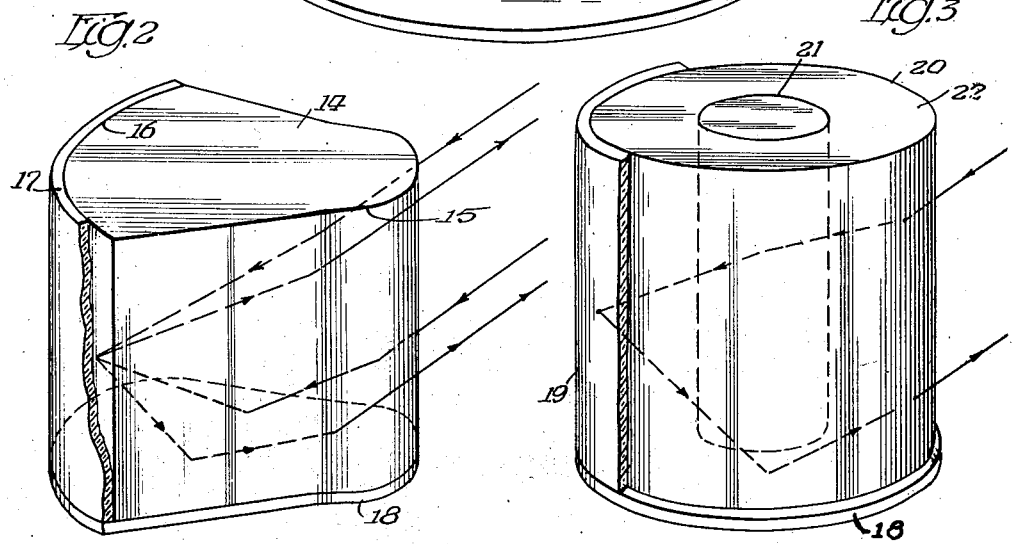
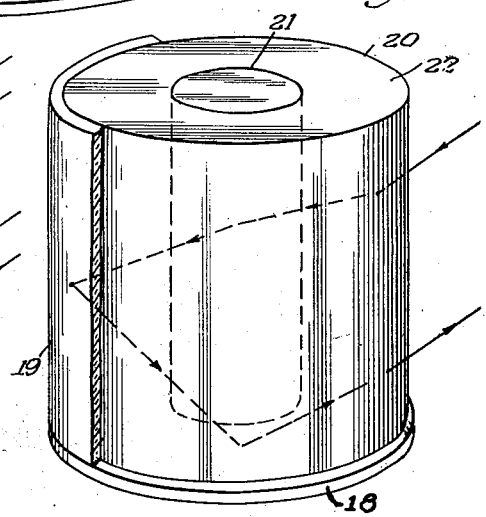
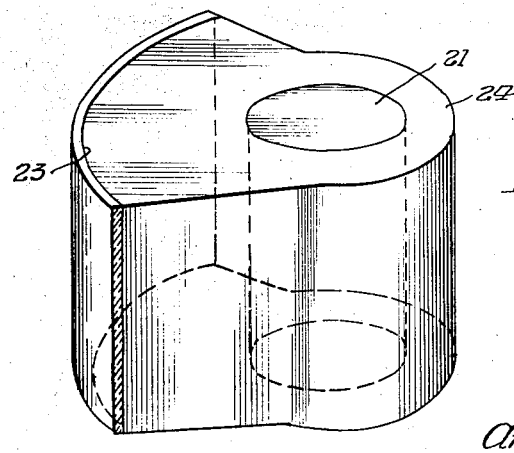
Inventor
Arthur F. Eckel
By Kent W. Womrell
Atty.

April 17, 1945.  A. F. ECKEL  2,374,003
COLLINEAR REFLECTOR
Filed Feb. 23, 1942  2 Sheets-Sheet 2
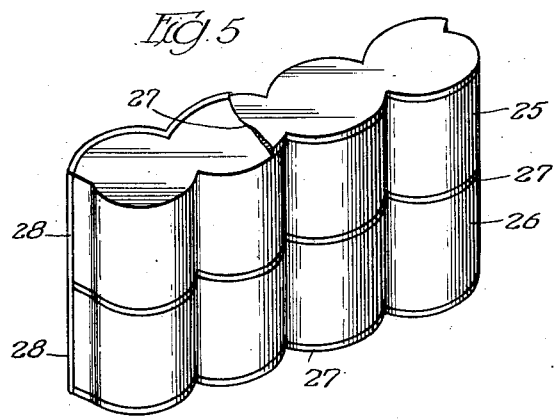
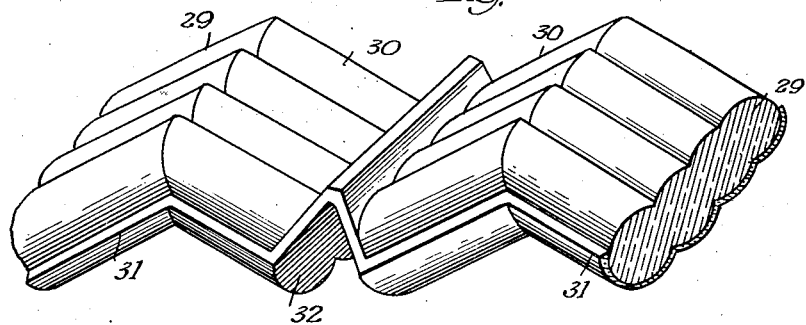
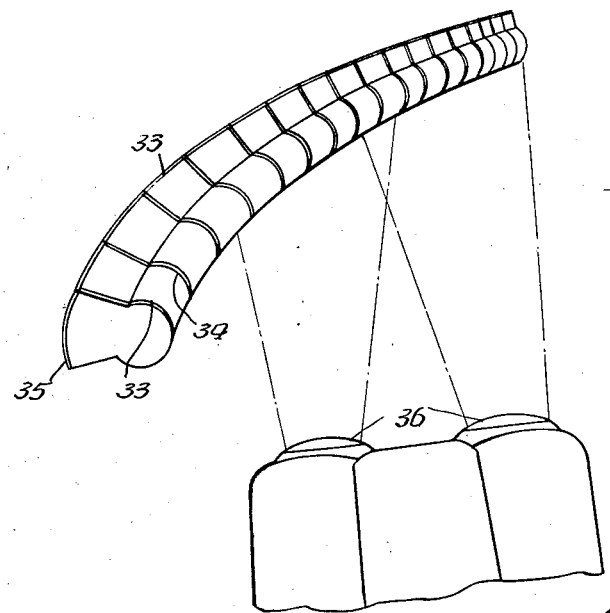
Inventor
Arthur F. Eckel
By Kent W. Worrell
Atty.

Patented Apr. 17, 1945

2,374,003

UNITED STATES PATENT OFFICE 2,374,003

COLLINEAR REFLECTOR

Arthur F. Eckel, Wilmette, Ill.

Application February 23, 1942, Serial No. 432,015

10 Claims. (Cl. 88—82)

This application is a continuation in part of my Patent No. 2,273,847, of February 24, 1942.

This invention relates in general to a reflecting unit, or system, particularly used in highway advertising signs and safety signals, sometimes in the form of a reflector button, or a plurality of such buttons to form a directional or indicator sign, but have a more general use wherever applicable.

As in the application of which this is a continuation in part, the more important objects of the invention are to provide a collinear reflecting unit included in an optical system having a wide field angle or aspect of vision in which the effective optical angle is constant for the entire field; to provide an optical system comprising units having two or more cylindrical refracting and reflecting media having different refractive indices; to provide a structure of this kind having a correct ray converging effect because of the finite separation of the optical surfaces thereby shortening the effective focal length of the unit and resulting in a unit of shorter length along the principal axis of the reflected and refracted rays, and thus in a saving of a material amount of glass or other refracting media.

Other objects of the invention will appear in the specification and will be apparent from the accompanying drawings in which Fig. 1 is a perspective of a cylindrical refracting lens followed by a cylindrical mirror and both at right angles to a plane mirror;

Fig. 2 shows a variation of Fig. 1 in which the refracting medium is extended back to a curved cylindrical mirror, and both are orthogonal to a plane reflecting mirror;

Fig. 3 is a perspective showing two refracting cylindrical lenses, one inside the other, the inner one having a higher index of refraction than the outer one and both reflector and refractor having a mirror in the dihedral plane of truncation and the indices of refraction related so that the focal image falls on the back cylindrical surface which has the same radius of curvature as the front cylindrical surface;

Fig. 4 is a perspective of a system similar to that shown in Fig. 3 where the indices of refraction of the inner and outer cylindrical surfaces are not so related as to produce a focal image on the continuation of the front cylindrical surface, but which still corrects for spherical aberration;

Fig. 5 illustrates a multiplicity of connected units of the types herein set forth;

Fig. 6 is a broken perspective illustrating an alternative arrangement of a plurality of the units of this invention where the units are inclined appreciably to each other to avoid single reflections in the system; and Fig. 7 illustrates a number of reflecting units, in accordance with this invention, placed end to end, and illuminated by headlights, to mark the location of a line such as an indicating line of a highway.

This invention and its principals are illustrated in a general way in Fig. 1 which shows a cylindrical lens 1 positioned parallel to but spaced from a segmental cylindrical reflecting mirror 2 so that light from a distant source traveling in the direction of rays 3, 4 may be focused in a line image 5 on mirror 2. The rays 3 and 4 after refraction in the lens 1 focus at a particular point 6 in the line image 5, and because of the inclination of the rays at 6 to the generating element of the cylindrical mirror 2 are reflected and redirected along lines 7 and 8. A plane mirror 9 positioned at right angles both to lens 1 and mirror 2 intercepts rays 7 and 8 at 10 and 11 and reflects them in the directions 12 and 13 (after refraction in lens 1) so that rays 3, 4, 12 and 13 are parallel to each other or approximately parallel. Therefore, light from a distant source coming into this system so that the rays encounter the refracting cylinder and the two mirrors in the manner disclosed will be returned to the source in two reflections and therefore with exceedingly high intensity.

This system is thus exceedingly efficient for high reflection of rays very oblique to the cylindrical elements, and the system therefore has a wide angle of aspect and reflection which becomes valuable for a collinear or auto-collimating reflector unit.

In variations of this invention and particularly where it is advantageous to make an entire reflector unit of a single piece of glass, for instance where a multiplicity of units are employed, or where the cost of manufacture is important, a reflector unit may be made as shown in Fig. 2 in which a lens portion 14 has a refracting curve 15 molded on one side and a reflecting curve 16 on the other side. A reflecting mirror 17 and a right angled mirror 18 may be in intimate and direct contact with the glass as, for example, a silver or metal coating directly on the curved surface 16 and at the bottom or one end thereof.

The perfection demanded of reflectors in the present state of the art requires that they must operate for large angles of obliquity from normal incidence, and this, in turn, necessitates a reflecting mirror 19 as shown in Fig. 3 as close as possible to the refracting front surface 20. In my former application of which this is a continuation in part, the advantages are disclosed in employing a glass inner refracting portion 21 having a higher index of refraction than the outer lens portion 22, increasing the convergency of the inner rays to equal the convergency of the outer extremities of the refracting portion 22. In this case, the axial rays travel through the inner portion 21 and the outer rays skip it. Since increasing the angle of operation requires actually shorter radii of curvature for the front refracting shell, the accretion of spherical aberration due to this cause is compensated for by the increase in convergency of the inner refracting portion 21 in Fig. 3.

Where it is difficult to meet the index of refraction requirements in locating the focal surface on the same cylinder, the reflecting back focal surface 23 in Fig. 4 may be of greater radius than the front cylindrical surface 24. Although this would increase the angle of oblique aberration, the advantage in obtaining a spherical aberration correction remains, and such a system having a refracting core 21 is valuable for this correction, particularly in optical systems where light energy is considered entirely from the standpoint of luminous efficiency and not considered important from the standpoint of faithful image formation.

It is evident that practical use necessitates the employment of the reflecting units disclosed in this invention either as an arrangement of single units, or in multiple, and this may be to form a line or an area. In certain multiple arrangements, the location of the individual units might not be appropriate for the conditions of reflection as outlined in the discussion of Fig. 1, and for this reason, a novel arrangement is required to fulfill the optical requirements. In Fig. 5, a multiple arrangement is shown in which a top section 25 of connected units is separate from a similar bottom section 26. The separation is necessary in order to provide reflectors 27 for both ends of the top and bottom sections and also rear reflectors 28. A multiple system such as shown in Fig. 5 is useful for oblique illumination, but not for head-on or normal incidence of light for which the optical requirements in Fig. 1 are not fully met.

If a system is to function specifically for head-on reflection and for wide oblique reflection, a multiple arrangement as shown in Fig. 6 is necessary. In this, a multiple lens with angularly disposed portions 29 and 30 is molded from a single piece of glass, the upper side being clear or transmissive and the under side and ends having a mirror reflector 31 and 32 formed by a coating or a metal supporting shell. The inclination of the cylindrical portions 29 and 30 may be varied within wide limits and adjusted appropriately for the use intended. A novel linear arrangement is shown in Fig. 7 where a number of single units 33 are placed end to end either in a straight or curved line or to form other letters or characters with reflecting coatings or mirrors 34 between and at the ends of the units and with other reflecting coatings or mirrors 35 at the bottoms for receiving and returning illumination as from the lamps 36 of an automobile.

Other and various combinations of forms, ingredients and elements having different indices of refraction may be combined to provide reflecting and refracting units and combinations of such units in cylindrical form for increasing the converging power of the system and enlarging the angle aspect and the optical field of the units.

I claim:

1. An optical collinear reflecting and refracting unit comprising two materials of different indices of refraction and including a circular center and an outer circular ring together forming a cylindrical reflector in which the reflecting surfaces have continuous curves of related radii of curvature for producing a wide and substantially continuous total field of aspect.

2. An auto-collimating reflector unit comprising a front cylindrical refracting lens, a rear cylindrical concave reflector, and a plane reflecting surface positioned orthogonal to the lens and reflector.

3. A reflector unit comprising a rear cylindrical concave reflecting mirror, a plane mirror at right angles thereto, and a front refracting convex cylinder parallel to the rear reflecting mirror.

4. A cylindrical reflecting unit comprising a front cylindrical convex refracting lens, a back cylindrical concave reflector parallel thereto, and means forming a reflecting surface orthogonal to the lens and reflector and comprising a plane of truncation thereof.

5. A reflector unit comprising a cylindrical reflector, a cylindrical lens in front of but extending to the reflector, means forming a reflecting surface orthogonal to the lens and reflector, the reflector and reflecting surface comprising metal reflecting coatings in intimate contact with the lens.

6. A collinear reflector system comprising cylindrical media of different refracting indices in which the centers of curvature of the different media are not coincident but are located eccentrically to utilize conjugate applanatic points for converging incident and reflected rays within the radius of the outer medium.

7. A reflector unit comprising two refractive cylindrical lens portions one within the other having plane reflecting end surfaces, the inner cylindrical refracting portion of a higher index of refraction than the outer portion, said inner cylindrical lens increasing the convergency of axial rays to equal the average convergency of the outer cylindrical portion acting alone, and a concave reflecting cylindrical back surface parallel to said front refracting combination and orthogonal to an end reflecting surface.

8. The combination of a multiplicity of cylindrical retroflective units comprising an integral multiplicity of parallel units of transversely cut sections, the sections being arranged end to end in a predetermined area, reflectors interposed directly between the cut sections and other reflectors at the rear of the sections orthogonal to the reflectors between them.

9. A reflector unit comprising a front cylindrical convex refracting system, a parallel rear cylindrical concave reflecting system, and two plane reflecting ends for the cylindrical refracting system perpendicular to the cylindrical elements thereof.

10. A reflector unit comprising an outer cylindrical shell and an inner cylindrical lens having a greater index of refraction than the shell, a cylindrical reflector placed parallel to the lens and shell at the focus of the combination, and a third plane reflecting surface at the ends of the said reflecting and refracting system and orthogonal thereto.

ARTHUR F. ECKEL.